Patented Jan. 9, 1923.

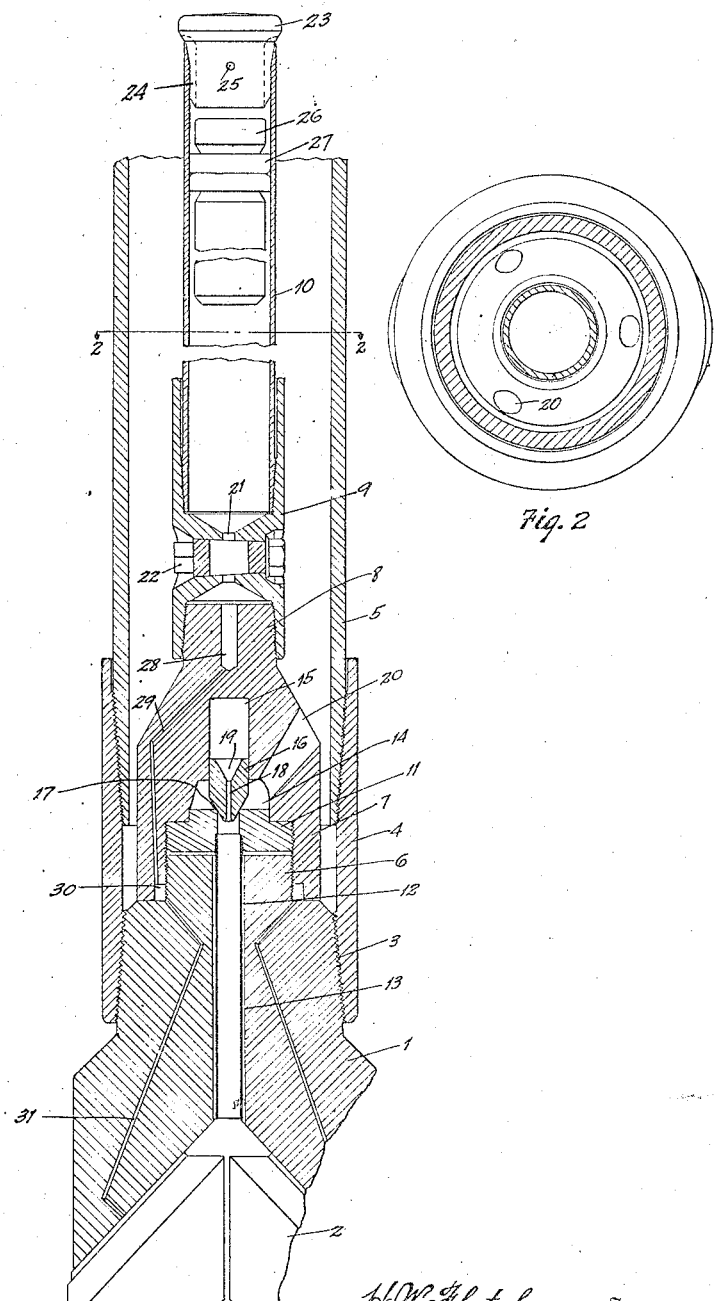

1,441,220

UNITED STATES PATENT OFFICE.

HAROLD W. FLETCHER, OF HOUSTON, TEXAS, ASSIGNOR TO HUGHES TOOL COMPANY, OF HOUSTON, TEXAS, A CORPORATION OF TEXAS.

ROLLER EARTH-BORING DRILL.

Application filed May 25, 1922. Serial No. 563,568.

*To all whom it may concern:*

Be it known that I, HAROLD W. FLETCHER, a citizen of the United States, residing at Houston, Harris County, Texas, have invented a certain new and useful Improvement in Roller Earth-Boring Drills, of which the following is a full, clear, and exact description, such as will enable others skilled in the art to which it appertains to make and use the same.

My invention relates to an improvement in roller earth boring drills, and has particular application to an improvement in the flushing system which carries away the cuttings from the drill and serves to exert a pressure upon the lubricating device, whereby the cutters are supplied with lubricant.

In the ordinary type of roller earth boring drill now in use, the rotary cutters thereon are lubricated by means of a lubricator secured to the head of the bit and from which oil ducts lead to the bearings of the cutters. The flushing water which is pumped forcibly downward through the drill stem and the head of the bit upon the cutters serves to carry away the cuttings in suspension to the surface outside of the drill stem. It also serves to exert a pressure upon a piston resting on the lubricant and to thereby force the lubricant downwardly to the cutters. An objection which sometimes arises in the use of the flushing water to operate the lubricating system is that the force exerted by the pumps is not steady and continuous and for that reason the pressure upon the lubricator piston is somewhat intermittent and does not result in a steady flow of the lubricant to the cutter bearings.

It is an object of this invention to provide means whereby the pump pressure in the drill stem will be made steady and uniform so that the feed of lubricant will be also uniform and continuous during the operation of the drill.

Referring to the drawing herewith Fig. 1 is a central longitudinal section through a drill stem and lubricator showing the use of my invention, and Fig. 2 is a transverse section on the plane 2—2 of Fig. 1.

I have shown my improvement as attached to a drill ordinarily used in cutting rock. It has a head 1 having conical shaped cutters 2 on the forward end thereof. The upper end of the head is reduced in diameter and threaded at 3 for attachment by means of a drill collar 4 to the drill stem 5. At the central upper end of the head is a further reduced shank 6 threaded exteriorly to provide attachment for a lubricator collar 7. This collar is tapered somewhat and threaded at the upper end at 8 for attachment to a coupling 9 by means of which it is connected to the lubricator barrel 10.

The lubricator collar 7 is recessed at its lower end to receive the shank 6 of the bit and also to provide attachment for a valve seat 11 screwed therein. Said valve seat has a central passage therethrough threaded on the lower side for attachment to a pipe 12 constituting a water course for the flushing fluid. The head of the drill is formed with a central channel 13 therethrough to receive the water course. The upper end of the valve seat is reduced in diameter and fitted within a chamber 14 in the lubricator collar. Above the chamber 14 the said collar is provided with a central cylindrical recess or counterbore 15 to slidably receive a valve 16. This valve is cylindrical on its outer surface to fit the recess 15 and is tapered at its lower end to fit within the valve seat 17 formed in the upper end of the member 11. Said valve is formed with a central bore 18 enlarged at 19 at its upper end.

The chamber 14 adjacent the valve is formed with three upwardly inclined water channels 20 to allow passage for the flushing water downwardly to the cutters.

The coupling 9 has a central reduced passage 21 therethrough, adapted to be closed by a rotary valve 22 of ordinary construction. The lubricator barrel 10 is closed at the upper end by means of a plug 23, this plug being provided with passages 24 therethrough to permit the entrance of flushing water to the upper end of the lubricator barrel. An opening 25 diametrically through the plug 23 and the barrel of the lubricator forms a seat for a cotter pin or other similar means to secure the said plug in position in the lubricator barrel. Below the said plug is a piston 26 having cups 27 thereon fitting fluid tight against the inner walls of the barrel. The said piston is adapted to rest on the upper surface of the lubricant and will be forced down by the pressure of the flushing fluid against the lubricant, driving it outwardly through the passage 21 in the coupling 9 and into a corresponding passage 28 in the upper end of the lubricator collar 7. At the lower end of the passage 28 are ducts 29 leading to an annular channel 30 formed in the lower face of the lubricator collar. This channel extends entirely around the upper shank of the bit and is connected by means of the oil ducts 31 to the bearings of the cutters which are to be lubricated.

In the operation of my device the flushing fluid will be pumped downwardly through the drill stem to the bit and will find a passage through the openings 20 in the lubricator collar to the valve chamber 14. Pressure of the flushing fluid upon the lower tapered surface of the valve 16 will force it upwardly out of its seat and allow the flushing water to pass downwardly through the water course 12 to the cutters. The greater the pressure of the water within the valve chamber the higher the valve will be lifted by the pressure of the water and the larger will be the opening permitted for the passage of the water into the water course. Therefore, when the pressure is high the water course will be open approximately to its full extent, so that this pressure will be relieved. When, however, the pressure tends to drop in the drill stem the pressure in the valve chamber will also drop, allowing the valve 16 to partially close the opening in the valve seat 17. This will tend to back up the pressure in the drill stem and to increase the amount of pressure exerted upon the piston in the lubricator chamber. It is obvious that, with the weight of the valve 16 properly adjusted, the said valve will serve to relieve the pressure when it tends to build up beyond a certain desired point, or will tend to close and thereby build up the pressure when the pressure would otherwise tend to fall. The action of the valve will thereby be practically automatic in its regulation of the pressure in the neighborhood of the lubricator. The opening 18 in the valve allows the passage from the chamber 15 above the valve of the fluid which might tend to gather there and prevent the free action of valve.

The advantages of this pressure-regulating valve lie largely in the uniform water pressure obtained within the drill stem, whereby the piston may be forced with a fairly constant and uniform pressure upon the lubricant. The flow of the lubricant to the bearings will therefore be uniform. By adjusting the weight of the valve the pressure necessary to the proper feed of lubricant can be maintained regardless of the speed of the pumps.

Having thus described my invention what I claim as new and desire to protect by Letters Patent is:

1. In a roller earth-boring drill, a drill head, roller cutters thereon, a lubricator collar on said drill, a fluid passage through said collar and drill head, a valve seat in said passage, a valve in said seat having a tapered lower end, the upper end being slidable into a recess in said collar, a lubricator barrel on said collar having connection with the bearings of said cutters, and a piston in said barrel adapted to be forced against the lubricant by fluid pressure, said valve acting to regulate said pressure.

2. In a roller earth boring drill, a head having roller cutters thereon, a lubricator collar on said head, a fluid channel through said collar and said head, a valve seat in said passage, an upwardly opening valve slidable in said head and adapted to be raised from its seat by a predetermined pressure of the fluid, a lubricator on said collar actuated by the pressure of said fluid and connections between said lubricator and the bearings of said cutters.

3. In a roller earth boring drill, a drill stem, a head thereon having roller cutters secured thereto, a passage through said head for flushing fluid, an upwardly opening valve in said passage, said valve having a tapered lower surface, the upper end being slidable in a recess in said collar, whereby a predetermined fluid pressure downwardly through the passage will raise said valve, and a fluid-pressure-operated lubricator on said head having connection with the bearings of said cutters.

4. In a roller earth boring drill, a drill stem, a drill head thereon, rolling cutters on said head, a passage from said drill stem through said head for flushing fluid, a valve seat in said passage, a valve therein of larger diameter than the passage through said seat, the upper end of said valve being slidable in a recess, whereby a predetermined fluid pressure will raise said valve from its seat, a fluid pressure operated lubricator on said head and passages from said lubricator to the bearings of said cutters.

5. In a roller earth boring drill, a drill stem, a head thereon, rolling cutters on said head, a passage for flushing fluid through said head from said drill stem, a lubricant container on said head having channels leading therefrom to the bearings of said cutters, fluid pressure operated means to force said lubricant from said container, and means in said fluid passage to maintain said fluid pressure automatically to a predetermined amount.

In testimony whereof, I hereunto affix my signature, this the 20th day of May, A. D., 1922.

HAROLD W. FLETCHER.